United States Patent
Tsai et al.

(10) Patent No.: US 9,407,741 B1
(45) Date of Patent: Aug. 2, 2016

(54) PORTABLE ELECTRONIC DEVICE

(71) Applicant: HTC Corporation, Taoyuan (TW)

(72) Inventors: Tiao-Hsing Tsai, Taoyuan (TW);
Chien-Pin Chiu, Taoyuan (TW);
Hsiao-Wei Wu, Taoyuan (TW);
Yi-Hsiang Kung, Taoyuan (TW);
Li-Yuan Fang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/874,476

(22) Filed: Oct. 5, 2015

(51) Int. Cl.
*H04B 1/38* (2015.01)
*H04M 1/02* (2006.01)
*H03H 7/38* (2006.01)

(52) U.S. Cl.
CPC ............. *H04M 1/0262* (2013.01); *H03H 7/38* (2013.01); *H04M 1/0274* (2013.01)

(58) Field of Classification Search
CPC .......... H04B 1/38; H04B 1/0385; H04B 1/40; H04B 1/006; H04M 1/0262; H04M 1/0274; H04W 8/24; H04W 88/06; H01Q 1/243; H01Q 1/273; H01Q 1/38; H01Q 1/50; H01Q 5/20; H01Q 5/50; H03H 7/38
See application file for complete search history.

(56) References Cited

U.S. PATENT DOCUMENTS

| 2010/0016024 | A1* | 1/2010 | Yang | H01Q 1/44 455/566 |
| 2014/0274231 | A1* | 9/2014 | De Luis | H04W 88/06 455/575.7 |
| 2015/0188217 | A1* | 7/2015 | Tsai | H01Q 1/273 343/702 |
| 2015/0255860 | A1* | 9/2015 | Lienau | H01Q 1/273 343/702 |
| 2015/0333403 | A1* | 11/2015 | Wong | H01Q 5/50 343/857 |

* cited by examiner

*Primary Examiner* — Thanh Le
(74) *Attorney, Agent, or Firm* — Jianq Chyun IP Office

(57) ABSTRACT

A portable electronic device including a substrate, a first metal element, a second metal element and a battery is provided. The substrate has a ground plane. The first metal element is disposed on a carrier and has a feeding point. The second metal element is disposed on the carrier and is electrically connected to the ground plane. The second metal element and the first metal element are spaced apart by a coupling distance, and the portable electronic device operates in at least one band through the first metal element and the second metal element. An orthogonal projection of the battery on the carrier is overlapped with an orthogonal projection of the second metal element.

11 Claims, 4 Drawing Sheets

PORTABLE ELECTRONIC DEVICE

BACKGROUND OF THE INVENTION

1. Field of the Invention

The invention is related to an electronic device, and particularly related to a portable electronic device with a battery.

2. Description of Related Art

In recent years, various types of portable electronic devices have been developed rapidly. For instance, in addition to smart phones, smart bracelets or smart watches also attract people's attention gradually and become new popular products on the market. However, smart bracelets and smart watches are much smaller in size as compared to the smart phones, and therefore, the space available for disposing an antenna element in the portable electronic device is more limited. Accordingly, how to dispose the antenna element in a limited space to facilitate the miniaturization of the portable electronic device has become an important issue.

SUMMARY OF THE INVENTION

The invention provides a portable electronic device, which may operate in at least one band through a first metal element and a second metal element. Moreover, the second metal element and a battery may be stacked with each other, so as to facilitate the miniaturization of the portable electronic device.

In the invention, the portable electronic device includes a substrate, a first metal element, a second metal element and a battery, wherein the substrate has a ground plane. The first metal element is disposed on a carrier and has a feeding point. The second metal element is disposed on the carrier and electrically connected to the ground plane. In addition, the second metal element and the first metal element are spaced apart by a coupling distance. The portable electronic device operates in at least one band through the first metal element and the second metal element. An orthogonal projection of the battery on the carrier is overlapped with an orthogonal projection of the second metal element on the carrier.

In an embodiment of the invention, the battery includes a metal housing, and the second metal element and the metal housing are formed integrally.

In an embodiment of the invention, the battery includes a plastic housing, and the second metal element is attached to the plastic housing.

Based on the above, the portable electronic device of the invention may operate in at least one band through the first metal element and the second metal element. Moreover, the orthogonal projection of the battery on the carrier is overlapped with the orthogonal projection of the second metal element on the carrier, so as to facilitate the miniaturization of the portable electronic device.

In order to make the aforementioned features and advantages of the invention more comprehensible, embodiments accompanying figures are described in detail below.

DESCRIPTION OF EMBODIMENTS

Figure 1:
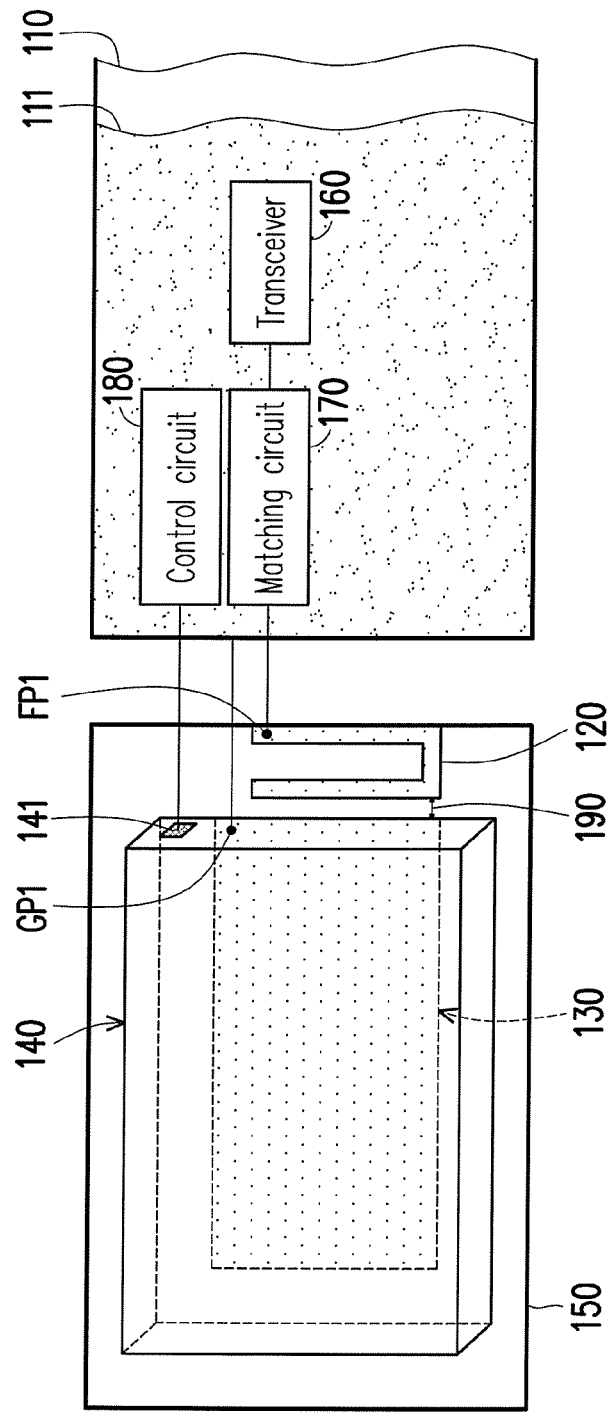
FIG. 1 is a schematic view illustrating a portable electronic device according to an embodiment of the invention.

FIG. 1 is a schematic view illustrating a portable electronic device according to an embodiment of the invention. As shown in FIG. 1, a portable electronic device 10 includes a substrate 110, a first metal element 120, a second metal element 130, a battery 140, a carrier 150, a transceiver 160, a matching circuit 170 and a control circuit 180. The substrate 110 has a ground plane 111, and the transceiver 160, matching circuit 170 and control circuit 180 are disposed on the substrate 110.

On the other hand, the first metal element 120 and the second metal element 130 are disposed on the carrier 150. Furthermore, the first metal element 120 has a feeding point FP1. The second metal element 130 has a ground point GP1 to be electrically connected to the ground plane 111. In addition, an orthogonal projection of the battery 140 on the carrier 150 is overlapped with an orthogonal projection of the second metal element 130 on the carrier 150. Specifically, the battery 140 and the second metal element 130 may be stacked with each other above the carrier 150. For the convenience of illustration, in FIG. 1, a relative position of the second metal element 130 is illustrated with dotted lines. In addition, in an embodiment, the second metal element 130 may also be regarded as a metal surface of the battery 140.

Figure 2:
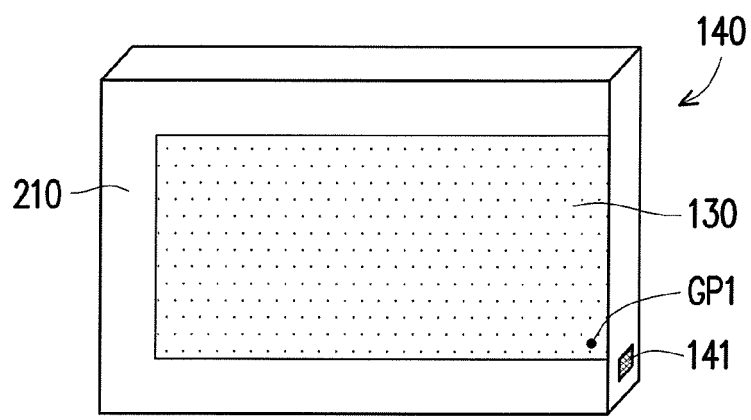
FIG. 2 is a schematic view illustrating a battery and a second metal element according to an embodiment of the invention.

For example, FIG. 2 is a schematic view illustrating a battery and a second metal element according to an embodiment of the invention. As shown in FIG. 2, the battery 140 includes a housing 210, and the housing 210 may be, for example, a metal housing or a plastic housing. In addition, if the housing 210 is a metal housing, the second metal element 130 and the metal housing may be formed integrally. On the other hand, if the housing 210 is a plastic housing, the second metal element 130 may be attached to the plastic housing. In other words, since the battery 140 and the second metal element 130 may be stacked with each other, the second metal element 130 may be regarded as a part of the battery 140, so as to facilitate the miniaturization of the portable electronic device 10. In addition, in an embodiment, the battery 140 may further dissipate heat through the second metal element 130. For instance, the heat energy from the battery 140 may be transmitted to the air through the second metal element 130. That is, the second metal element 130 may further serve as a heat dissipation element for the battery 140.

Please further refer to FIG. 1. The control circuit 180 is electrically connected to a connector 141 of the battery 140 to control the battery 140. For example, the control circuit 180 may control charge and discharge of the battery 140. The transceiver 160 may generate a feeding signal. Further, the first metal element 120 may receive the feeding signal from the transceiver 160 through the feeding point FP1. Moreover, the second metal element 130 and the first metal element 120 are spaced apart by a coupling distance 190, such that the feeding signal from the first metal element 120 can be coupled to the second metal element 130. Accordingly, the first metal element 120 and the second metal element 130 may form a coupling antenna, such that the portable electronic device 10 operates in at least one band through the first metal element 120 and the second metal element 130.

Figure 3:
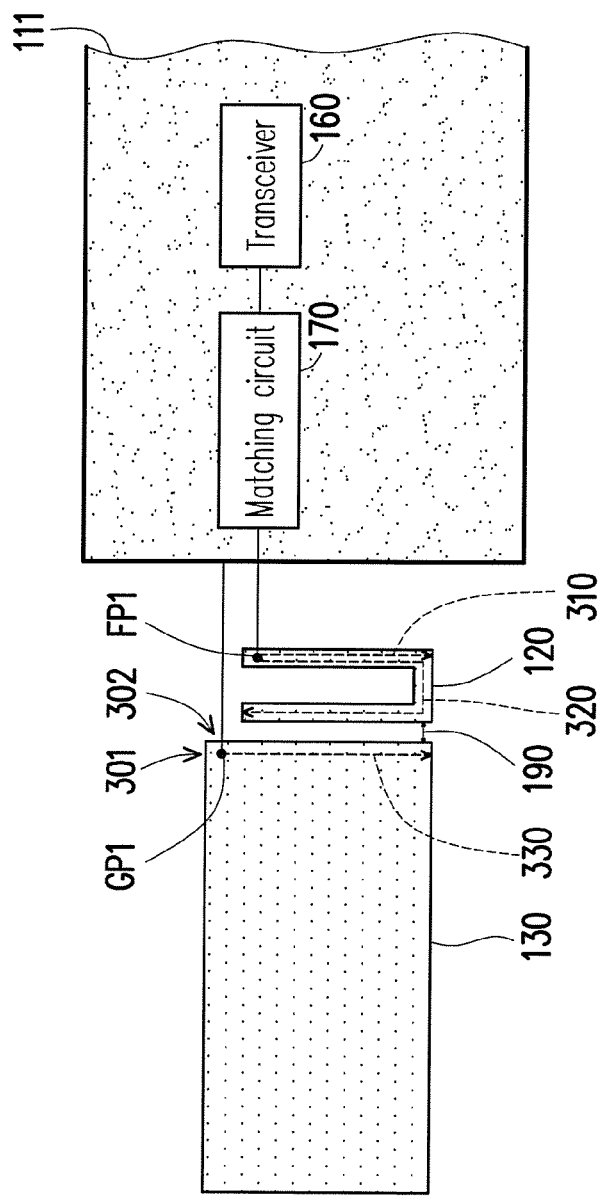
FIG. 3 is a schematic view illustrating operation of a first metal element and a second metal element according to an embodiment of the invention.

For example, FIG. 3 is a schematic view illustrating operation of the first metal element and the second metal element according to an embodiment of the invention. As shown in FIG. 3, the shape of the first metal element 120 may be, for example, a U-shape; the shape of the second metal element 130 may be, for example, a rectangle. Furthermore, the second metal element 130 includes a first edge 301 and a second edge 302 adjacent to each other, and the second edge 302 of the second metal element 130 is spaced by a coupling distance 190 from the first metal element 120. Furthermore, a ground point GP1 in the second metal element 130 is adjacent to an intersection of the first edge 301 and the second edge 302.

In operation, the first metal element 120 may form a first resonant path, such that the coupling antenna may generate a first resonant mode. For example, in the first resonant mode, the first metal element 120 may generate a current path 310, such that the coupling antenna may receive or transmit a radio-frequency signal in the first band. Furthermore, the first metal element 120 and the second metal element 130 may form a second resonant path, such that the coupling antenna generates a second resonant mode. For example, in the second resonant mode, the first metal element 120 may generate a current path 320, and the second metal element 130 may generate a current path 330, such that the coupling antenna may receive or transmit a radio-frequency signal in the second band.

In other words, the portable electronic device 10 may form the first resonant path through the first metal element 120 to operate the first band in the at least one band. In addition, the portable electronic device 10 may form the second resonant path through the first metal element 120 and the second metal element 130 to operate the second band in the at least one band. Furthermore, a length of the first resonant path is ¼ of a wavelength of the lowest frequency in the first band, and a length of the second resonant path is ½ of a wavelength of the lowest frequency in the second band.

Moreover, the matching circuit 170 is electrically connected between the first metal element 120 and the transceiver 160, such that an impedance of the first metal element 120 to match an impedance of the transceiver 160. Accordingly, radiation characteristics of the first metal element 120 and the second metal element 130 may be further enhanced by the matching circuit 170, so as to facilitate improving the reception quality of the portable electronic device 10. Furthermore, persons having ordinary skill in the art may selectively remove the matching circuit 170 based on design requirements.

It should be noted that the first metal element 120 and the second metal element 130 may form the coupling antenna. Moreover, the battery 140 and the second metal element 130 in the coupling antenna may be stacked with each other; therefore, the second metal element 130 in the coupling antenna may be regarded as a part of the battery 140, so as to facilitate the miniaturization of the portable electronic device 10. Further, the coupling antenna (i.e., the first metal element 120 and the second metal element 130) disposed on the carrier 150 has good radiation characteristics, and the battery 140 and the electronic elements (e.g., control circuit 180) on the substrate 110 are not affected by the coupling antenna (i.e., the first metal element 120 and the second metal element 130).

Figure 4:
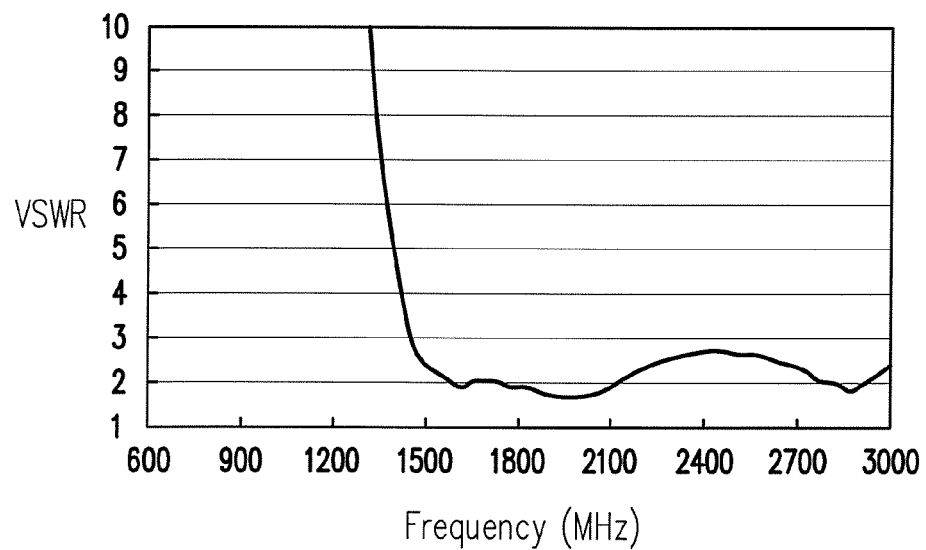
FIG. 4 is a view illustrating a voltage standing wave ratio (VSWR) of a coupling antenna according to an embodiment of the invention.

For instance, FIG. 4 is a view illustrating a voltage standing wave ratio (VSWR) of a coupling antenna according to an embodiment of the invention. As shown in FIG. 4, the first band covered by the coupling antenna may be, for example, a 2400 MHz~2483.5 MHz band according to Bluetooth communication standard, and the second band covered by the coupling antenna may be, for example, 1565 MHz, 1575 MHz and 1615 MHz bands used by a positioning system. Moreover, the VSWR of the coupling antenna in the first band and the second band is below 3.

Figure 5:
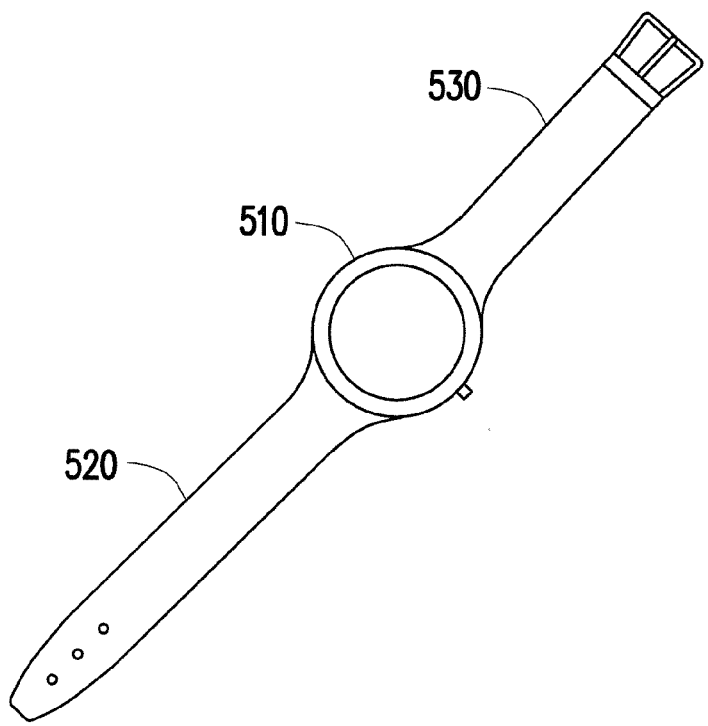
FIG. 5 is a schematic view illustrating the appearance of a portable electronic device according to an embodiment of the invention.

It should be noted that the battery 140 and second metal element 130 may be stacked with each other, so as to facilitate the miniaturization of the portable electronic device 10. As a result, the portable electronic device 10 may meet the application requirement in the wearable technology. For instance, FIG. 5 is a schematic view illustrating the appearance of a portable electronic device according to an embodiment of the invention. As shown in FIG. 5, the portable electronic device 10 may be, for instance, a smart watch, and the portable electronic device 10 further includes a watch body 510, a watch belt 520, and a watch belt 530.

Specifically, the watch belt 520 and the watch belt 530 are connected to the watch body 510, and each includes a belt-shaped structure to facilitate wearing for users. In addition, the watch body 510 may be constructed as a device body of the portable electronic device 10, and the substrate 110 shown in FIG. 1 may be, for example, disposed in the device body (i.e., the watch body 510). Furthermore, the watch belt 520 may be used to constitute the carrier 150 of the portable electronic device 10. In other words, the first metal element 120, second metal element 130 and battery 140 in FIG. 1 may be disposed on the carrier 150 (i.e., watch belt 520). Further, the transceiver 160, matching circuit 170 and the control circuit 180 in FIG. 1 may be disposed in the device body (i.e., watch body 510).

To sum up, the first metal element and second metal element in the portable electronic device of the invention are disposed on the carrier. Furthermore, the orthogonal projection of the battery on the carrier is overlapped with the orthogonal projection of the second metal element on the carrier. In addition, the portable electronic device operates in the at least one band through the first metal element and the second metal element. Accordingly, the battery and the second metal element may be stacked with each other, so as to facilitate the miniaturization of the portable electronic device. As a result, the portable electronic device may meet the application requirement in the wearable technology.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A portable electronic device, comprising:
    a substrate having a ground plane;
    a first metal element disposed on a carrier and having a feeding point;
    a second metal element disposed on the carrier and electrically connected to the ground plane, wherein the second metal element and the first metal element are spaced apart by a coupling distance, and the portable electronic device operates in at least one band through the first metal element and the second metal element; and
    a battery, an orthogonal projection of the battery on the carrier being overlapped with an orthogonal projection of the second metal element on the carrier.

2. The portable electronic device according to claim 1, wherein the battery comprises a metal housing, and the second metal element and the metal housing are formed integrally.

3. The portable electronic device according to claim 1, wherein the battery comprises a plastic housing, and the second metal element is attached to the plastic housing.

4. The portable electronic device according to claim 1, further comprising:
   a transceiver disposed on the substrate and generating a feeding signal, and the first metal element receiving the feeding signal through the feeding point; and
   a control circuit disposed on the substrate and controlling the battery.

5. The portable electronic device according to claim 4, further comprising:
   a matching circuit disposed on the substrate and electrically connected between the first metal element and the transceiver, such that an impedance of the first metal element matches an impedance of the transceiver.

6. The portable electronic device according to claim 5, further comprising:
   a device body connected to the carrier, wherein the substrate is disposed in the device body, and the carrier has a belt-shaped structure.

7. The portable electronic device according to claim 1, wherein the portable electronic device forms a first resonant path through the first metal element to operate a first band in the at least one band, and a length of the first resonant path is ¼ of a wavelength of a lowest frequency in the first band.

8. The portable electronic device according to claim 7, wherein the portable electronic device forms a second resonant path through the first metal element and the second metal element to operate a second frequency in the at least one band, and a length of the second resonant path is ½ of a wavelength of a lowest frequency in the second band.

9. The portable electronic device according to claim 8, wherein the first metal element is in a U-shape, and the second metal element is in a rectangular shape.

10. The portable electronic device according to claim 1, wherein the second metal element comprises a first edge and a second edge adjacent to each other, the second edge and the first metal element are spaced apart by the coupling distance, the second metal element is electrically connected to the ground plane through a ground point, and the ground point is adjacent to an intersection of the first edge and the second edge.

11. The portable electronic device according to claim 10, wherein the first metal element is in a U-shape, and the second metal element and a metal housing of the battery are formed integrally.

* * * * *